United States Patent [19]

Kohno et al.

[11] Patent Number: 4,835,198

[45] Date of Patent: May 30, 1989

[54] POLYMER COMPOSITION AND TEXTILE SIZING AGENT MADE THEREFROM

[75] Inventors: Hiroji Kohno; Kohji Moritani, both of Kurashiki; Toshiaki Sato, Nishinomiya; Junnosuke Yamauchi, Kurashiki; Takuji Okaya, Nagaokakyo, all of Japan

[73] Assignee: Kuraray Co., Ltd., Kurashiki, Japan

[21] Appl. No.: 54,899

[22] Filed: May 28, 1987

[30] Foreign Application Priority Data

Jun. 6, 1986 [JP] Japan ................................. 61-132044
Jun. 6, 1986 [JP] Japan ................................. 61-132045
Jun. 6, 1986 [JP] Japan ................................. 61-132046

[51] Int. Cl.$^4$ ................... C08L 29/04; D06M 15/333
[52] U.S. Cl. ........................................ 524/47; 524/52; 524/53; 8/115.6
[58] Field of Search ................... 524/47, 50, 51, 52, 524/53; 8/115.6; 427/220; 428/365

[56] References Cited

U.S. PATENT DOCUMENTS

| | | | |
|---|---|---|---|
| 3,557,250 | 1/1971 | Imai et al. | 525/6 |
| 3,804,785 | 4/1974 | Hijiya et al. | 524/53 |
| 4,070,319 | 1/1978 | Carel et al. | 524/555 |
| 4,617,239 | 10/1986 | Maruyama et al. | 428/511 |
| 4,624,985 | 11/1986 | Tsutsumi et al. | 524/803 |

OTHER PUBLICATIONS

Patent Abstracts of Japan, vol. 5, No. 120 (C-65) [792], Aug. 4, 1981; & JP-A-56 55 440.

*Primary Examiner*—John Kight
*Assistant Examiner*—Nathan M. Nutter
*Attorney, Agent, or Firm*—Oblon, Fisher, Spivak, McClelland & Maier

[57] ABSTRACT

Disclosed herein is a highly compatible polymer composition which comprises (A) starch, (B) vinyl alcohol polymer having an alkyl group of 4 to 50 carbon atoms at the terminal, and/or (C) polyvinyl alcohol. Disclosed also herein is a textile sizing agent having outstanding weavability which comprises (A) starch, (B) vinyl alcohol polymer having an alkyl group of 4 to 50 carbo atoms at the terminal, (C) polyvinyl alcohol, and (D) oil for textile sizing.

8 Claims, 3 Drawing Sheets

POLYMER COMPOSITION AND TEXTILE SIZING AGENT MADE THEREFROM

BACKGROUND OF THE INVENTION

1. Field of the Invention

The present invention relates to a polymer composition having excellent compatibility composed of (A) starch and (B) vinyl alcohol polymer having an alkyl group of 4 to 50 carbon atoms at the terminal.

The present invention relates further to a polymer composition having excellent compatibility composed of (A) starch, (B) vinyl alcohol polymer having an alkyl group of 4 to 50 carbon atoms at the terminal, and (C) polyvinyl alcohol.

The present invention relates also to a textile sizing agent which gives yarn good weavability. More particularly, it relates to a textile sizing agent to give yarn good weavability, which is composed of (A) starch, (B) vinyl alcohol polymer having an alkyl group of 4 to 50 carbon atoms at the terminal, (C) polyvinyl alcohol, and (D) oil for textile sizing.

2. Description of the Prior Art

A mixture of starch and polyvinyl alcohol (abbreviated as PVA hereinafter) has a usage for warp sizing and paper sizing because it is water-soluble and good in film-forming performance and natural starch is water-soluble and readily available at a low price. However, it has some disadvantages: A mixed aqueous solution of starch and PVA is so unstable as to cause the separation of solutes, because of the poor compatibility of starch and PVA, which are both polymeric compound. In addition, it forms a film which is poor in transparency and other film properties.

For the improvement of the compatibility of starch and PVA, many attempts were made to use various kinds of modified starch (including starch derivatives such as etherified starch, esterified starch, and cationized starch; and decomposition products of starch such as oxidized starch and dextrin). Starch derivatives are expensive and decomposition products of starch have a disadvantage ascribed to their lower molecular weight than natural starch. That is, a mixed aqueous solution of a decomposition product of starch and PVA is stable but does not provide a film of good properties. In other words, these starch derivatives and decomposition products of starch are not satisfactory in compatibility with PVA.

On the other hand, it is known that modified PVA copolymerized with monomers having long-chain alkyl groups of 4-20 carbon atoms has improved compatibility with natural starch. ( Japanese Patent Laid-open Nos. 4544/1981 and 55440/1981.) A mixed aqueous solution of the modified PVA and starch is stabler than that of unmodified PVA and starch. Nevertheless, it easily gels and does not form a film of satisfactory properties. Furthermore, the modified PVA is not effective for the above-mentioned modified starch.

As for PVA, there is known a process for producing a vinyl alcohol polymer having a long-chain alkyl group at the terminal. (See Japanese Patent Publication No. 1831/1973 and Japanese Patent Laid-open No. 108207/1983.) However, nothing is known about the compatibility of this vinyl alcohol polymer with starch.

In the meantime, there is an ever-increasing demand for a warp size having higher performance than before. The warp size has become necessary for high-speed weaving and production of high-quality textiles since the advent of modern looms including shuttle looms, gripper looms, rapier looms, water jet looms, and air jet looms, which are used for weaving natural fibers (such as cotton and wool), semisynthetic fibers ( such as rayon, acetate and etc.) , and synthetic fibers (such as nylon, polyester, and acrylic).

To make a sizing agent for warp sizing, starch, PVA, and acrylic size are used individually or in combination with one another. They are also used in combination with oil for textile sizing and carboxymethylcellulose. PVA is most popular among them, and it is used in the form of completely saponified PVA, partially saponified PVA, anion-modified PVA, or cation-modified PVA or other modified PVA. Modified PVA in which a hydrophobic group is copolymerized is also known( as disclosed in Japanese Patent Laid-open Nos.55440/1981 and 174683/1983). They are all intended to improve the adhesion of a sizing agent to hydrophobic fibers such as polyester and nylon, thereby to improve the cohesive force and abrasive resistance and to reduce the yarn hairiness.

There are known processes for producing a vinyl alcohol polymer having a long-chain alkyl group at the terminal( as disclosed in Japanese Patent Publication No. 1831/1973 and Japanese Patent Laid-open Nos. 108207/1983 and 102946/1984). It is also known that the vinyl alcohol polymer has improved abrasive resistance due to a low coefficient of friction(as disclosed in Japanese Patent Publication No. 22218/1969) and the vinyl alcohol polymer can be used for the surface modification of molded items(as disclosed in Japanese Patent Publication No. 18258/1971).

A warp sizing agent for spun yarns is usually composed of PVA and starch. PVA is preferred because of its stable quality attributable to its being a synthetic polymer, its good film-forming performance and ability to form film of good properties, and its good adhesion to fibers. Starch is preferred because of its low price and its ready availability. The disadvantage of this sizing agent is that PVA and starch are poor in compatibility with each other because they are both polymeric compounds. Therefore, a mixed aqueous solution of PVA and starch is so unstable that PVA and starch readily separate from each other. Moreover, the aqueous solution of PVA and starch becomes poor in sizing performance after standing for a couple of days to such an extent that it cannot be used again.

PVA and starch are often used in combination with acrylic size, oil for textile sizing, and/or CMC. Oil for textile sizing is used to (1) make smooth the yarn surface, (2) promote the infiltration of the size solution, (3) make the sized yarn hygroscopic, (4) impart antistatic properties, (5) prevent the yarn from sticking to the drying cylinder of the sizing machine, (6) make the yarn soft, and (7) improve the yarn handling. Oil for textile sizing includes various vegetable oils, paraffin wax, and surface active agents. Paraffin wax and vegetable oils are generally used where (1),(5),(6) and(7) are the major objectives. They are emulsified and dispersed into water by an emulsifier (a nonionic or ionic surface active agent). Nevertheless, they are essentially poor in compatibility with PVA and starch and the sizing solution thereof is poor in stability. The film formed from the sizing solution is not uniform in quality and poor in strength and elongation, although it softens the yarn. Elongation is so low that the film as a whole is brittle and poor in abrasive resistance. Thus, the sizing agent is not suitable for warps to be woven into high-quality textiles or to be woven on a high-speed loom such as air jet loom.

There is a warp sizing agent based on anion-modified PVA, cation-modified PVA, or PVA copolymerized with a hydrophobic group. This sizing agent, when dissolved in water by heating, forms a stable sizing solution; but the stability is not still satisfactory. The film formed after drying of the size solution is not completely uniform. Therefore, this sizing agent is not satisfactory in weavability where high-quality textiles and high-speed looms are involved.

Another means to improve the compatibility is to add an acrylic size to a mixture of PVA, starch and oil for textile sizing. However, the improvement in compatibility is insufficient.

SUMMARY OF THE INVENTION

With the above-mentioned in mind, the present inventors carried out a series of researches which led to the findings mentioned below.

(A) starch and (B) vinyl alcohol polymer having an alkyl group of to 50 carbon atoms at the terminal are compatible with each other ,and a polymer composition composed of them(referred to as polymer composition (I) hereinafter) forms a stable aqueous solution which remains almost unchanged in viscosity with time and the aqueous solution provides a transparent film having good film properties.

When the polymer composition (I) is incorporated with (C) PVA, the

When the polymer constituents in the resulting composition (referred to as polymer composition (II) hereinafter) are compatible with one another, and it forms a stable aqueous solution which remains almost unchanged in viscosity with time and the aqueous solution provides a transparent film having good film properties.

In addition, when a sizing agent composed of (A) starch, (C) PVA, and (D)oil for textile sizing is incorporated with (B) vinyl alcohol polymer having an alkyl group of 4 to 50 carbon atoms at the terminal, the compatibility of starch and PVA improves and the emulsification and dispersion of oil for textile sizing also improve, and the resulting sizing agent is stable and provides uniform film. The yarn sized by this sizing agent shows an excellent elongation, softness, and abrasive resistance, and the reduced yarn hairiness.

The present invention was completed on the basis of these findings.

DETAILED DESCRIPTION OF THE PREFERRED EMBODIMENTS

Figure 1:
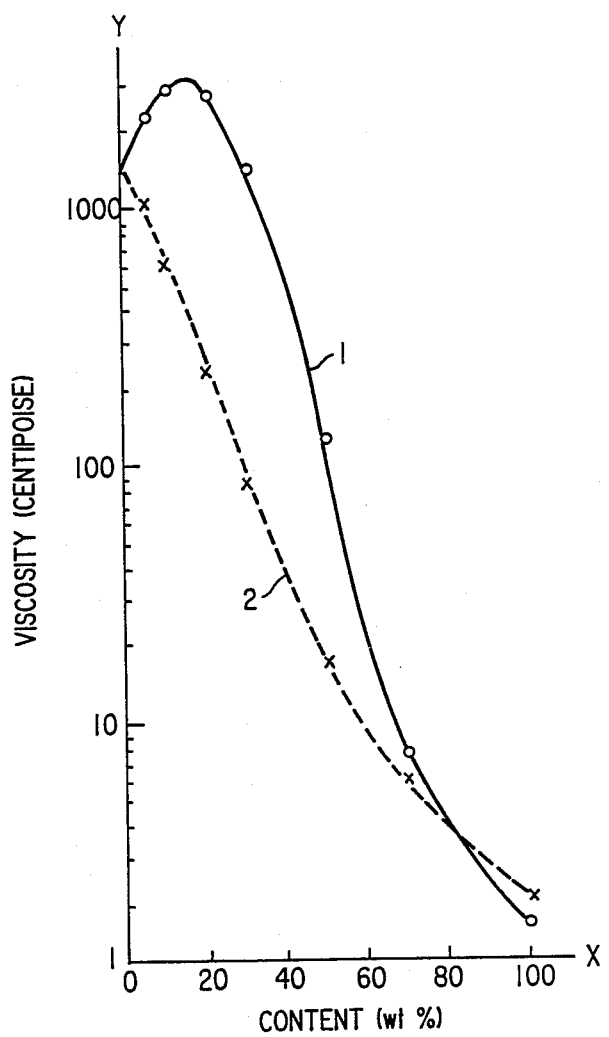
FIG. 1 is a graph in which the viscosity of an aqueous solution of polymer composition (I) ( which is a mixture of corn starch and vinyl alcohol polymer having an alkyl group of 4 to 50 carbon atoms at the terminal or ordinary PVA ) is plotted against the content of vinyl alcohol polymer having an alkyl group of 4 to 50 carbon atoms at the terminal or ordinary PVA. The abscissa (X) represents the content (wt %) of vinyl alcohol polymer having an alkyl group of 4 to 50 carbon atoms at the terminal or ordinary PVA in the total solids. The ordinate (Y) represents the viscosity of the aqueous solution measured with a Brookfield viscometer at 20° c. The solid line (1) represents the results obtained with solutions containing corn starch and vinyl alcohol polymer having an alkyl group of 4 to 50 carbon atoms at the terminal, and the broken line (2) represents the results obtained with solutions containing corn starch and ordinary PVA ("Kuraray PVA-105")

At first, a description is made of polymer composition (I) in the invention which is composed of (A)starch and (B) vinyl alcohol polymer having an alkyl group of 4 to 50 carbon atoms at the terminal Polymer composition (I) in the invention contains (B)vinyl alcohol polymer having an alkyl group of 4 to 50 carbon atoms(hydrophobic group) at the terminal (referred to as terminal-modified PVA hereinafter), which is described in the following.

The terminal long-chain alkyl group should be one which has 4 to 50 carbon atoms. With carbon atoms less than 4 , the terminal-modified PVA is not so different from unmodified PVA and is not satisfactorily compatible with starch. With carbon atoms more than 50, the terminal-modified PVA is excessively hydrophobic and is poor in water solubility. As the results, it is poor in compatibility with starch. Therefore, the number of carbon atoms should be 4 to 50, preferably 8 to 24. Examples of such alkyl groups include straight-chain alkyl groups, branched-chain alkyl groups, and alkylaryl groups each having 4–50 carbon atoms. They may contain O, N, S-atom etc.

The polymer should have a degree of polymerization in the range of 10 to 3000, preferably 50 to 2500, depending on the amount of terminal groups introduced during the polymerization reaction. The polymer is not limited in the degree of saponification: but it is usually not less than 50 mol %, preferably not less than 70 mol %.

The polymer may contain vinyl alcohol units, vinyl ester units such as vinyl acetate units, and a small amount of copolymer units. Examples of the copolymer units include α-olefins such as ethylene, propylene, and isobutene; unsaturated carboxylic acid such as acrylic acid, methacrylic acid, crotonic acid, maleic acid, itaconic acid, and maleic anhydride, and salts thereof and alkyl esters thereof; acrylonitrile, methacrylonitrile, acrylamide, methacrylamide, alkylvinyl ether, N,N-dimethylacrylamide, N-vinylpyrrolidone, vinyl chloride, vinylidene chloride, vinyl propionate, vinyl ester of Versatic acid, and 2-acrylamidepropanesulfonic acid and salt thereof. They are not limitative.

The terminal-modified PVA (B) can be produced in several manners. According to a preferred process for industrial production, a monomer composed mainly of vinyl ester (such as vinyl acetate) is polymerized in the presence of mercaptan having an alkyl group of 4 to 50 carbon atoms and the resulting polyvinyl ester is saponified in the usual way.

The starch (A) is one which comes from wheat, corn, rice, potatoes, sweet potatoes, tapioca, and sago palm. Among them, wheat starch and corn starch are adequate. The starch may be used in the form of starch derivative such as dextrin, oxidized starch, etherified starch, esterified starch, and cationized starch.

The mixing ratio of (B) terminal-modified PVA to (A) starch is 0.5–10000 parts by weight, preferably 5–2000 parts by weight for 100 parts by weight of (A).

Where the major objective is to improve the stability of the aqueous solution of starch, the mixing ratio of (B) to (A) should be not less than 0.5, preferably not less than 5 ( in parts by weight) for 00 parts by weight of (A). The terminal-modified PVA (B) in an amount less than 0.5 parts by weight for 100 parts by weight of starch (A) is not sufficient to produce a desired effect. Where the major objective is to improve the quality of starch film, the amount of (B) should be not less than 10 parts by weight, preferably not less than 20 parts by weight, for 100 parts by weight of (A).

If the amount of starch (A) is less than 1 part by weight for 100 parts by weight of terminal-modified PVA (B), the resulting mixture is substantially identical with (B) alone.

The polymer composition (I) of the invention which is composed of (A) starch and (B) terminal-modified PVA has the following features.

The polymer composition (I) provides an aqueous solution which is clearer, stabler (with less change in viscosity after standing), and easier to handle than an aqueous solution of a mixture of starch and an ordinary PVA ( such as PVA, anion-modified PVA, cation-modified PVA, non ion-modified PVA, and other modified PVA). Presumably, this is because starch is uniformly dispersed in water without agglomeration on account of the extremely good compatibility of (A)-starch and (B) terminal-modified PVA. In the case of a PVA copolymer in which long-chain alkyl groups are randomly copolymerized, the aqueous solution containing a PVA copolymer in which long-chain alkyl group are randomly copolymerized and starch is slightly improved in stability, but is not so stable as the aqueous solution of polymer composition (I) of the present invention.

The viscosity of the mixed aqueous solution of (A) starch and (B) terminal-modified PVA suggests the presence of a unique interaction between (A) and (B). This was experimentally proved as follows: Aqueous solutions were prepared by dissolving in water 5 wt % of corn starch and varied amount of terminal-modified PVA having a $C_{12}H_{25}$-alkyl group, a degree of polymerization of 100, and a degree of saponification of 99.2 mol %, followed by cooking at 95° c for 2 hours with stirring. The viscosity of the aqueous solutions was measured at 90° C. using a Brookfield viscometer. The same experiment was repeated except that the terminal-modified PVA was replaced by "Kuraray Poval PVA-105" having a degree of polymerization of 550 and a degree of saponification of 98.5 mol %. The results are shown in FIG. 1.

In FIG. 1, the solid line (1) represents the results obtained with solutions containing corn starch and terminal-modified PVA, and the broken line (2) represents the results obtained with solutions containing corn starch and PVA-105. It is noted that in the case of corn starch/PVA-105 aqueous solutions, the viscosity decreases as the PVA content increases. By contrast, in the case of aqueous solutions containing corn starch and (B) terminal-modified PVA has generally a higher viscosity than the corn starch/ PVA-105 aqueous solutions (despite the fact that the viscosity of aqueous solutions of (B) terminal-modified PVA alone is lower than that of aqueous solutions of PVA-105). Moreover, the viscosity reaches the maximum when the content of (B) terminal-modified PVA is 10–30 wt %. This fact apparently indicates the unique interaction between corn starch and (B) terminal-modified PVA.

A modified PVA formed by copolymerizing with long-chain alkyl groups improves the stability of the mixed aqueous solutions; but it does not prevent gelation completely. In addition, it is not effective for modified starch. Unlike a modified PVA formed by copolymerizing with long-chain alkyl group, the terminal-modified PVA(B) has the good surface activity on account of the hydrophobic terminal long-chain alkyl group and the hydrophilic PVA moiety which are connected blockwise. It is considered that the terminal long-chain alkyl group improves the compatibility with starch and the PVA moiety promotes the dispersion into water. This is what differentiates the terminal-modified PVA from the modified PVA randomly containing long-chain alkyl groups.

Polymer composition (I) of the present invention is characterized by that the aqueous solution of it changes in viscosity very little with time. This suggests that the starch in it is protected from deterioration. Starch is composed of amylose and amylopectin, and starch deterioration is caused by the crystallization of amylose. It is known that amylose is compatible with a fatty acid because of their interaction.

The terminal-modified PVA is also interactive with amylose because of the terminal long-chain alkyl group similar to a fatty acid. The PVA moiety facilitates the dispersion into water. Presumably, this is the reason why the starch is protected from deterioration.

It was found that the terminal-modified PVA (B) used in the present invention interacts with amylopectin. (This had not been known well before.) This interaction was confirmed by the following experiment. Amylopectin isolated from corn starch was mixed at varied ratios with a vinyl alcohol polymer having a $C_{12}H_{25}$ alkyl group at the terminal, a degree of polymerization of 280, and a degree of saponification of 98.5 mol %. The resulting mixtures were dissolved in water, followed by cooking at 95° c for 2 hours. Thus there were obtained 1.5wt % aqueous solutions containing vinyl alcohol polymer having a $C_{12}H_{25}$ alkyl group at the terminal and amylopectin. The Brookfield viscosity and transmittance of the aqueous solutions were measured at 20 ° c.[Transmittance was measured at a wavelength of 650 nm and a cell width of 10 mm using a spectrophotometer (made by Hitachi Ltd.)]

The results are shown in Table 1.

TABLE 1

| Terminal-modified PVA (wt %)* | 0 | 10 | 20 | 30 | 50 |
|---|---|---|---|---|---|
| Viscosity (centipoise) | 8 | 10 | 12 | 14 | 17 |
| Transmittance (%) | 18 | 20 | 30 | 42 | 50 |

*Ratio of terminal-modified PVA in the total solids.

It is noted from Table 1 that both viscosity and transmittance increase as the amount of the terminal-modified PVA (B) increases. Incidentally, the viscosity of an aqueous solution containing 1.5 wt % of the terminal-modified PVA(B) alone is as same as water having a viscosity of about 1 centipoise.

The same experiment was performed except that ordinary PVA("Kuraray Poval PVA-105") was used in place of the terminal-modified PVA.

In the case of aqueous solutions containing amylopectin and ordinary PVA ("Kuraray Poval PVA-105") having a degree of polymerization of 550 and a degree of saponification of 98.5 mol %, viscosity was about 8 centipoise and transmittance was 16-18% regardless of the amount of PVA-105. This result suggests the presence of a characteristic interaction between the terminal-modified PVA (B) and amylopectin. Such an interaction is not observed in the case of ordinary PVA, modified PVA copolymerized with long-chain alkyl groups and other modified PVA.

The fact that the terminal-modified PVA (B) interacts with amylose as well as amylopectin is considered to be the reason why it is compatible with not only natural starch but also oxidized starch and other modified starch.

The aqueous solution of polymer composition(I) of the invention provides an extremely uniform, clear film which is superior in strength and elongation to film formed from an aqueous solution containing starch and ordinary PVA.

Presumably, this is because the terminal long-chain alkyl group enhances the interaction with starch and the hydrophilic PVA moiety prevents the agglomeration of starch particles and keep them uniformly dispersed. This effect is pronounced by the blockwise construction of the hydrophobic long-chain alkyl group and the hydrophilic PVA moiety.

The mixing of (A) starch and (B) terminal-modified PVA is accomplished in any way. According to one way, the two components are mixed in powder form and the resulting mixture is added to water, or water is added to the resulting mixture, and then heated and dissolved. Alternatively, the two components are heated separately in water and the resulting solutions are mixed with each other.

The thus formed mixture may be incorporated with plasticizers, coloring agents, fillers, salts, boric acid or borax, water-soluble polymers, surface active agents, and other additives.

Polymer composition (I) of the invention can be used as a textile sizing agent, particularly warp sizing agent, paper finishing agent, adhesive, and stock for film making.

What follows is a description about polymer composition (II) of the present invention which is composed of (A) starch, (B) vinyl alcohol polymer having an alkyl group of 4 to 50 carbon atoms at the terminal (terminal-modified PVA) and (C) polyvinyl alcohol.

The (A) and (B) components are the same as those used in the abovementioned polymer composition (I).

The third component, (C) polyvinyl alcohol (abbreviated as PVA), may be ordinary PVA having a degree of polymerization of 100-3000, preferably 200-2500, and a degree of saponification not less than 50 mol %, preferably not less than 70 mol %. In addition, it may also be anion-modified PVA, cation-modified PVA, or nonion-modified PVA.

The formulation of polymer composition (11) of the invention varies over a broad range. The total amount of components [(B)+(C)] should be 2-10000 parts by weight, preferably 5-5000 parts by weight, for 100 parts by weight of component (A). If the total amount of component[(B)+(C)] is less than 2 parts by weight, the resulting composition has the same properties as those of starch. If the total amount of components (B)+(C)] is more than 10000 parts by weight, the resulting composition does not permit starch to produce its effect. The amount of component (C) should be 1-10000 parts by weight, preferably 1-5000 parts by weight, for 100 parts by weight of component (B).

The amount of component (B) should be 1-3000 parts by weight, preferably 5-1000 parts by weight, for 100 parts by weight of component (A). Where the major objective is to improve the stability of the aqueous solution of starch, the amount of component (B) should be not less than 1 part by weight, preferably not less than 5 parts by weight, for 100 parts by weight of component (A). If the amount of component (B) is less than 1 part by weight, the effect of component (B) is modest. Where the major objective is to improve the quality of starch film, the amount of component (B) should be not less than 10 parts by weight, preferably not less than 20 parts by weight, for 100 parts by weight of component (A). If the amount of component (B) is in excess of 5000 parts by weight for 100 parts by weight of component (A), the effect of component (A) is not produced.

Polymer composition (II) composed of (A) starch, (B) terminal-modified PVA, and (C) PVA has the following characteristic features.

Polymer composition (II) provides an aqueous solution which is clearer, stabler (with less change in viscosity after standing), and easier to handle than an aqueous solution of a mere mixture of starch (A) and PVA (C). Presumably, this is because starch (A) and terminal-modified PVA (B) are compatible with each other and starch particles ar kept uniformly dispersed in an aqueous solution without
e agglomeration. In addition, the terminal-modified pVA (B) and PVA (C) are considerably compatible with each other and consequently all the components are satisfactorily compatible with one another and the solution as a whole is stable. In the case of a modified PVA in which long-chain alkyl groups are randomly copolymerized, the aqueous solution containing this modified PVA and starch is slightly improved in stability as compared with the composition containing ordinary PVA, but is unstable than the aqueous solution of polymer composition (II) of the present invention.

The aqueous solution of polymer composition (II) of the invention provides an extremely uniform, clear film which is superior in strength and elongation to film formed from an aqueous solution containing only starch (A) and PVA (C).

Presumably, this is because the terminal long-chain alkyl group in the terminal-modified PVA (B) enhances the interaction with starch (A) and the hydrophilic PVA moiety in the terminal-modified PVA (B) prevents the agglomeration of starch particles and it has a good compatibility with PVA(C), therefore starch is uniformly dispersed in the form of fine particles. This effect is pronounced by the blockwise construction of the hydrophobic long-chain alkyl group and the hydrophilic PVA moiety.

The mixing of (A) starch, (B) terminal-modified PVA, and (C) PVA is accomplished in any way. According to one way, the three components are mixed in powder form and the resulting mixture is added to water, or water is added to the resulting mixture. Alternatively, the three components are heated separately in water and the resulting solutions are mixed with one another. The cooking of natural starch may be accomplished under either atmospheric pressure or high pressure; but the latter is preferable.

The thus formed mixture may be incorporated with plasticizers, coloring agents, fillers, salts, boric acid or borax, water-soluble polymers, surface active agents, and other additives.

Polymer composition (II) of the invention can be used as a textile sizing agent, particularly warp sizing agent, paper finishing agent, adhesive, and stock for film making.

The textile sizing agent made of the polymer composition of the invention is composed of (A) starch, (B) vinyl alcohol polymer having an alkyl group of 4 to 50 carbon atoms at the terminal (terminal-modified PVA), (C) PVA and (D) oil for textile sizing, as explained in the following.

The (A), (B) and (C) components are the same as those used in the above-mentioned polymer compositions (I) and (II).

The oil for textile sizing (D) is a vegetable oil, paraffin wax, or surface active agent. It is intended to make the sized yarn smoother, to impart softness, to prevent sized yarn from sticking to the drying cylinder, and to improve yarn handling. A vegetable oil or paraffin wax is mainly used.

The mixing ratio of (A) starch, (B) terminal-modified PVA, (C) PVA, and (D) oil for textile sizing is explained below.

The amount of component (A) should be 10-1900 parts by weight, for 100 parts by weight of components [(B)+(C)] in total. If the amount of component (A) is less than 10 parts by weight, the resulting sizing agent is not satisfactory in dividability; and if it is in excess of 1900 parts by weight, the resulting sizing agent forms film of poor properties and is poor in weavability.

The amount of component (D) should be 0.1-200 parts by weight for 100 parts by weight of components [(B)+(C)] in total. If the amount of component (D) is less than 0.1 parts by weight, the oil does not produce any effect; and if it is in excess of 200 parts by weight, the resulting sizing agent forms film of poor properties and is poor in weavability.

The amount of PVA (C) should be 0-10000 parts by weight for 100 parts by weight of component (B).

The amount of terminal-modified PVA (B) should be not less than 1 part by weight, preferably not less than 3 parts by weight, for 100 parts by weight of starch (A). With an amount less than 1 part by weight, no effect is produced.

The amount of terminal-modified PVA(B) should be not less than 0.1 parts by weight, preferably not less than 1 part by weight, for 100 parts by weight of oil for textile sizing(D). With an amount less than 0.1 parts by weight, no effect is produced for the emulsification and dispersion of oil for textile sizing.

A mixture containing (A) starch, (C) PVA, and (D) oil for textile sizing becomes stable when it is incorporated with (B) terminal-modified PVA. The terminal-modified PVA improves the emulsification and dispersion of oil for textile sizing (paraffin wax or vegetable oil) and prevents the phase separation of the size solution and stabilizes the viscosity of the size solution. The size solution thus prepared provides extremely uniform film.

If oil for textile sizing (D)(vegetable oil or paraffin wax) is added in the absence of terminal-modified PVA, the resulting size solution is unstable because it is poor in compatibility with (A)starch and (C) PVA. And the resulting size solution tends to provides uneven film having a low elongation. By contrast, the terminal-modified PVA(B) permits oil for textile sizing to uniformly disperse with the result that the size solution has improved stability and fluidity and provides uniform film. The thus formed film has a good elongation which tends to increase as the content of wax in the sizing agent increases up to 10-12 wt %.

The microscopic observation of the film reveals that paraffin wax or vegetable oil is distributed in the form of uniform fine particles Presumably, the emulsification and dispersion may be attributable to the high surface activity of terminal-modified PVA (B). However, this remarkable effect is not produced in the case of modified PVA formed by copolymerizing with monomer having hydrophobic groups. This suggests that the effect is not attributable to the surface activity alone; but it is considered that the effect is attributable not to the hydrophobic groups randomly distributed in the polymer chain but to the hydrophobic groups at the terminal. In other words, PVA having a hydrophobic group at one terminal improves the film forming properties of the sizing agent and permits the sizing agent to form film having good physical properties. This is because such PVA is composed of a terminal hydrophobic group and a hydrophilic PVA moiety. This structure produces surface activity and the PVA moiety itself has good film forming properties. In addition, the terminal-modified PVA is compatible with ordinary PVA, anion-modified PVA, cation-modified PVA, and other modified PVA.

The adhesion to fibers of terminal-modified PVA(B) is as good as that of ordinary PVA and other modified PVA.

Therefore, the sizing agent containing terminal-modified PVA (B) produces outstanding weavability when used for high-quality textiles and high-speed looms.

The sizing agent composed of (A) starch, (B) terminal-modified PVA (C)PVA, and (D)oil for textile sizing may be incorporated with acrylic sizing agent, carboxymethylcellulose, antifoam, and other additives without any problem.

As mentioned above, the textile sizing agent containing (B) terminal-modified PVA exhibits outstanding weavability when used for high-quality textiles and high-speed looms. Needless to say, it also exhibits outstanding weavability when used for other textiles and looms.

The textile sizing agent of the invention is formed by adding (B) terminal-modified PVA to a sizing agent containing (A) starch,(C)PVA, and (D)oil for textile sizing. The component(B) improves the compatibility of (A) starch and (C) PVA and also improves the emulsification and dispersion of (D) oil for textile sizing. Therefore, the sizing agent solution is stable and easy to handle. Moreover,(B)terminal-modified PVA improves the compatibility of the entire sizing agent. The sizing agent solution, upon drying, forms uniform film having high strength and elongation. The thus formed film improves abrasive resistance and reduces yarn-hairiness. For this reason, the textile sizing agent of the invention is effective for high-quality textiles and high-speed looms such as air jet loom.

The invention is now described in more detail with reference to the following examples, which should not be construed to restrict the scope of the invention. Quantities in the examples are based on weight, unless otherwise indicated.

In the following examples, the viscosity of the aqueous solutions was measured using a Brookfield viscometer.

The terminal-modified PVA(B) was prepared according to a process as explained in Referential Example that follows.

REFERENTIAL EXAMPLE

In a reaction vessel were placed 960 parts of vinyl acetate (abbreviated as VAc hereinafter), 230 parts of methanol, and 0.99 parts of n-dodecylmercaptan (abbreviated as n-DDM hereinafter). The air in the reaction vessel was completely replaced with nitrogen, and the external temperature was raised to 65° C. When the internal temperature reached 60° C., there was added 10 parts of methanol containing 0.174 parts of 2,2-azobisisobutyronitrile. Immediately thereafter, there was added 60 parts of 80% VAc solution in methanol containing 15.3 parts of n-DDM uniformly over 5 hours. Conversion to polymer after 5 hours was 48.2%. After 5 hours, the reaction vessel was cooled and the residual VAc was removed under reduced pressure while adding methanol. Thus there was obtained a 72% polyvinyl acetate (PVAc) solution in methanol. A portion of the solution was saponified with a methanol solution of NaOH at 40° C., while keeping the PVAc conc. at 50% and the molar ratio of [NaOH] to [VAc] at 0.1. There was obtained polyvinyl alcohol(PVA) having a degree of saponification of 99.2%. It had a degree of polymerizati (P) of 82 as calculated according to Nakajima equation (1) described below from $[\eta]$ measured in an acetone solution at 30 ° c.

$$[\eta] = 7.50 \times 10^{-4} \times (P)^{0.64} \qquad (1)$$

Table 2 below shows the characteristic properties of various kinds of terminal-modified PVA (B) used in the example that follow.

TABLE 2

| Code | Terminal long-chain alkyl group | Degree of polymerization | Degree of saponification | Comonomer |
|------|--------------------------------|--------------------------|--------------------------|-----------|
| P-1  | C$_4$H$_9$—    | 100  | 99.0 | None |
| P-2  | C$_{12}$H$_{25}$— | 100  | 99.0 | None |
| P-3  | C$_{12}$H$_{25}$— | 500  | 99.2 | None |
| P-4  | C$_{12}$H$_{25}$— | 1700 | 88.5 | None |
| P-5  | C$_{18}$H$_{37}$— | 100  | 76.5 | Itaconic acid 4 mol % |
| P-6  | C$_{12}$H$_{25}$— | 500  | 88.5 | None |
| P-7  | C$_8$H$_{17}$— | 100  | 99.0 | None |
| P-8  | C$_8$H$_{17}$— | 500  | 80.6 | None |
| P-9  | C$_3$H$_7$— | 100  | 99.0 | None |
| P-10 | C$_{18}$H$_{37}$— | 100  | 99.0 | None |
| P-11 | C$_{22}$H$_{45}$— | 100  | 99.0 | Maleic anhydride 3 mol % |

EXAMPLE 1

A mixture of terminal-modified PVA (P-2) and corn starch was heated and dissolved in an autoclave at 125° C. for 1 hour to give an aqueous solution containing 5% solids. The viscosity of the solution was measured at 20° C immediately after preparation and one week after preparation. The state of the solution was observed one week after preparation. The same experiment as above was carried out except that P-2 was replaced by P-6.

For comparison, a solution of corn starch alone was prepared (in Comparative Experiment 2) and a solution of corn starch and PVA ("Kuraray Poval PVA-105") having a degree of polymerization of 550 and a degree of saponification of 98.5 mol % was prepared (in Comparative Experiment 1) and the viscosity of the solutions was measured in the same manner as above. The results are shown in Table 3.

It is noted from Table 3 that the solution containing PVA-105 greatly changes in viscosity with time and is subject to phase separation. The solution containing corn starch alone is liable to gel soon after preparation. By contrast, the solution containing terminal-modified PVA changes only a little in viscosity with time and is stable even after standing.

TABLE 3

| Experiment No. | Kind of PVA | Composition (%) PVA | Composition (%) Corn-starch | Viscosity (20° C., cp) Immediately after dissolution | Viscosity (20° C., cp) One week after dissolution | State after one week |
|---|---|---|---|---|---|---|
| Experiment 1 | P-2 | 10 | 90 | 51 | 61 | good* |
|  |  | 30 | 70 | 65 | 70 | good |
|  |  | 70 | 30 | 1280 | 1350 | good |
| Experiment 2 | P-6 | 10 | 90 | 7.5 | 8.0 | good |

TABLE 3-continued

| Experiment No. | Kind of PVA | Composition (%) PVA | Composition (%) Corn-starch | Viscosity (20° C., cp) Immediately after dissolution | Viscosity (20° C., cp) One week after dissolution | State after one week |
|---|---|---|---|---|---|---|
| | | 30 | 70 | 15.5 | 16.0 | good |
| | | 70 | 30 | 170 | 175 | good |
| Comparative Experiment 1 | PVA-105 | 10 | 90 | 5.8 | 9.0 | poor** |
| | | 30 | 70 | 7.6 | 155 | poor |
| | | 70 | 30 | 130 | 160 | poor |
| Comparative Experiment 2 | — | — | 100 | 630 | gelled | gelled |

*stable without phase separation;
**phase separation

EXAMPLE 2

A 50:50 mixture (by weight) of corn starch and terminal-modified PVA of different type was heated in water at 95° c for 2 hours to give a 5% aqueous solution. , The viscosity of the aqueous solution was measured at 20° C. immediately after dissolution and two days after dissolution.

For comparison, aqueous solutions were prepared in the same manner as above, except that the terminal-modified PVA wa replaced by PVA ("Kuraray Poval PVA-117") having a degree of polymerization of 1750 and a degree of saponification of 98.5 mol % (in Comparative Experiment 3), long-chain alkyl group-modified PVA (PVA-L) formed by copolymerizing with 0.6 mol % of lauryl vinyl ether, having a degree of polymerization of 700 and a degree of saponification of 98.6 mol % (in Comparative Experiment 4), PVA (PVA-V) formed by copolymerizing with 3 mol % of Versatic acid and 1 mol % of itaconic acid, having a degree of polymerization of 700 and a degree of saponification of 96.5 mol % (in Comparative Experiment 5), and terminal-modified PVA(P-9)(in Comparative Experiment 6). The viscosity of the aqueous solutions was measured. The results are shown in Table 4.

It is noted from Table 4 that the long-chain alkyl group at the terminal should have 4 or more carbon atoms, and the one having 3 or less carbon atoms produce no effect. The modified PVA formed by copolymerizing with monomer having long-chain alkyl groups slightly improves the clarity of the aqueous solution, but it tends to cause gelation. By contrast, the aqueous solution containing a vinyl alcohol polymer having a long-chain alkyl group (having 4 or more carbon atoms) at the terminal changes only a little in viscosity with time and is easy to handle with good fluidity.

TABLE 4

| Experiment No. | PVA polymer | Viscosity (at 20° C., cp) Immediately after dissolution | Viscosity (at 20° C., cp) Two days after dissolution |
|---|---|---|---|
| Experiment 3 | P-1 | 80 | 85 |
| Experiment 4 | P-7 | 1120 | 1220 |
| Experiment 5 | P-5 | 1380 | 1520 |
| Experiment 6 | P-4 | 640 | 710 |
| Experiment 7 | P-11 | 1420 | 1480 |
| Comparative Experiment 3 | PVA-117 | 355 | separation |
| Comparative Experiment 4 | PVA-L | gelled | gelled |
| Comparative Experiment 5 | PVA-V | 960 | gelled |
| Comparative Experiment 6 | P-9 | 75 | tendency to separation |

EXAMPLE 3

In Experiment 8, P-2 (as the terminal-modified PVA) and oxidized starch ("Mermaid M-200" made by Shikishima Starch Mfg. Co., Ltd.) were dissolved in hot water at 95° C. to give a 10% aqueous solution.

Figure 2:
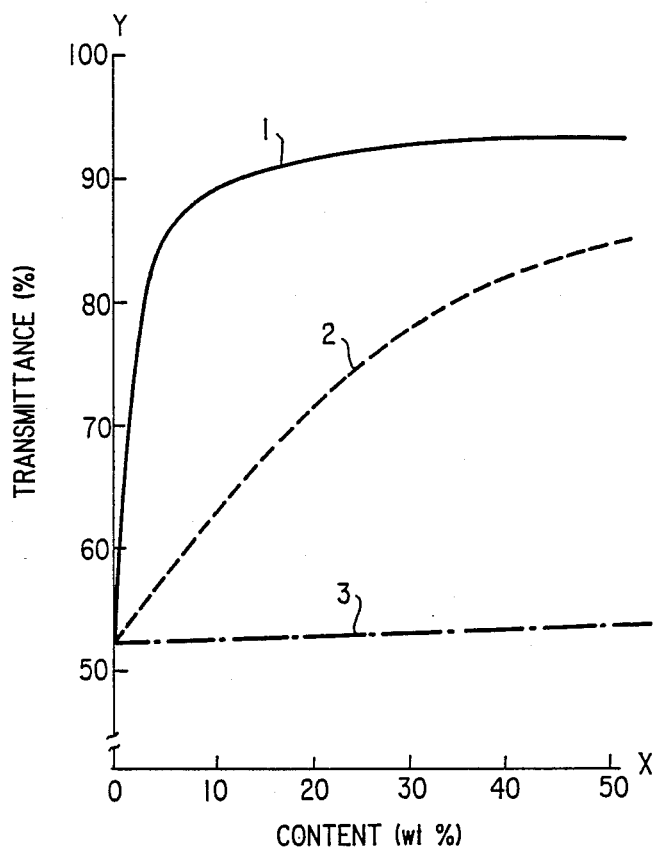
FIG. 2 is a graph in which the transmittance of an aqueous solution of the polymer composition (I) ( which is a mixture of oxidized starch and vinyl alcohol polymer having an alkyl group of 4 to 50 carbon atoms at the terminal or modified PVA copolymerized with monomer having long-chain alkyl group or ordinary PVA ) is plotted against the content of vinyl alcohol polymer having an alkyl group of 4 to 50 carbon atoms at the terminal or modified PVA copolymerized with monomer having long-chain alkyl group or ordinary PVA. The abscissa (X) represents the content (wt %) of vinyl alcohol polymer having an alkyl group of 4 to 50 carbon atoms at the terminal or modified PVA copolymerized with monomer having long-chain alkyl group or ordinary PVA in the total solids. The ordinate (Y) represents the transmittance of the aqueous solution at 20° c. The solid line (1) represents the results obtained with solutions containing oxidized starch and vinyl alcohol polymer having an alkyl group of 4 to 50 carbon atoms at the terminal, and the broken line (2) represents the results obtained with solutions containing oxidized starch and modified PVA copolymerized with monomer having long-chain alkyl group, and the chain line (3) represents the results obtained with solutions containing oxidized starch and PVA-105.

This aqueous solution was clearer than an aqueous solution containing oxidized starch alone. This suggests that the compatibility is improved by the addition of the terminal-modified PVA. The transmittance of the aqueous solution is shown in FIG. 2 (solid line 1)

In Comparative Experiment 7, aqueous solutions were prepared from PVA ("Kuraray Poval PVA-105") having a degree of polymerization of 550 and a degree of saponification of 98.5 mol % and oxidized starch ("Mermaid M-200"). The transmittance of the aqueous solutions was measured. The results are shown in FIG. 2 (chain line 3). The transmittance does not almost change regardless of the amount of PVA added. This suggests that PVA does not improve compatibility.

In Comparative Experiment 8, aqueous solutions were prepared from long-chain alkyl group-modified PVA (PVA-L) formed by copolymerizing 0.6 mol % of lauryl vinyl ether, having a degree of polymerization of 700 and a degree of saponification of 98.6 mol %, and oxidized starch ("Mermaid M-200"). The transmittance of the aqueous solutions was measured in the same manner as in Experiment 8. The results are shown in FIG. 2 (broken line 2). The compatibility in this Comparative Experiment 8 is better than than in Comparative Experiment 7 in which PVA-105 was added, but is poorer than that in Experiment 8 in which terminal-modified PVA was added.

The transmittance of the aqueous solutions was measured at a wavelength of 650 nm and a cell width of 10 mm, using a spectrophotometer made by Hitachi Ltd.

EXAMPLE 4

In Experiment 9, terminal-modified PVA (P-3) was dissolved in hot water to give a 10% aqueous solution. Separately, corn starch was heated at 120 ° c for 1 hour to give a 10 % aqueous solution. The two solutions were mixed at varied ratios. The mixed solution was cast onto a drum at 70° C. for film making. The strength and elongation of the film were measured after conditioning at 20° C and 65% RH for 1 week.

Comparative Experiment 9 was carried out in the same way as in Experiment 9, except that P-3 was replaced by PVA ("Kuraray Poval PVA-105") having a degree of polymerization of 550 and a degree of saponification of 98.5 mol %. Comparative Experiment 10 was carried out in the same way as in Experiment 9, except that P-3 was replaced by modified PVA (PVA-L)

formed by copolymerizing 0.6 mol % of lauryl vinyl ether, having a degree of polymerization of 700 and a degree of saponification of 98.6 mol %. The results are shown in Table 5.

It is noted that the film made from a solution containing terminal-modified PVA and corn starch has higher strength and elongation than those made from a solution containing PVA-105 and corn starch and a solution containing PVA-L and corn starch. In addition, the film in Experiment 9 is clearer (higher in transmittance) than that in Comparative Experiments 9 and 10. When it comes to film properties, the terminal-modified PVA having good compatibility with starch is superior to the modified PVA formed by copolymerization with monomer having long-chain alkyl groups.

The film properties were measured by using Shimadzu Autograph, Model DCS-100, made by Shimadzu Seisakusho Ltd., under the following conditions. Sample width: 15 mm, sample thickness: 60 μm, distance between two gauge marks: 50 mm, and rate of pulling: 500 mm/min.

The transmittance of the film was measured by using a spectrophotometer (made by Hitachi Ltd.) at a wavelength of 650 nm, with a blank being film made from a solution containing PVA-105 alone.

TABLE 5

| Experiment No. | Kind of PVA | Composition (%) | | Film properties | | |
|---|---|---|---|---|---|---|
| | | PVA | Corn-starch | Strength (kg/mm$^2$) | Elongation (%) | Transmittance (%) |
| Experiment 9 | P-2 | 20 | 80 | 2.40 | 36.2 | 35 |
| | | 50 | 50 | 3.02 | 70.2 | 97 |
| | | 70 | 30 | 2.87 | 140.2 | 98 |
| Comparative Experiment 9 | PVA-105 | 20 | 80 | 1.93 | 13.0 | 5 |
| | | 50 | 50 | 1.59 | 25.6 | 13 |
| | | 70 | 30 | 2.09 | 54.0 | 46 |
| Comparative Experiment 10 | PVA-L | 20 | 80 | 2.03 | 23.7 | 18 |
| | | 50 | 50 | 2.23 | 45.7 | 28 |
| | — | 70 | 30 | 2.34 | 96.4 | 51 |

TABLE 6

| Content of P-2 (parts per 100 parts of oxidized starch) | Viscosity (20° C., cp) | | State of solution |
|---|---|---|---|
| | Immediately after dissolution | Two days after dissolution | |
| 0 | 180 | 130 | separation |
| 5 | 178 | 176 | stable |
| 10 | 160 | 165 | stable |
| 20 | 140 | 145 | stable |
| 30 | 113 | 110 | stable |
| 50 | 106 | 110 | stable |
| 70 | 86 | 87 | stable |

EXAMPLE 6

In Experiments 11 to 15, mixed aqueous solutions were prepared by mixing 45 parts of 5% aqueous solution of corn starch dissolved at 120° C., 10 parts of 5% aqueous solution of terminal-modified PVA, and 45 parts of 5% aqueous solution of PVA ("Kuraray Poval PVA-105") having a degree of polymerization of 550 and a degree of saponification of 98.5 mol %. The viscosity of the thus prepared aqueous solutions was measured at 20° C. immediately after preparation and two days after preparation.

EXAMPLE 5

In general, the compatibility of PVA and oxidized starch is worst when they are mixed at a 50:50 ratio (by weight). To examine the effect of terminal-modified PVA on the improvement of compatibility , Experiment 10 was carried out as follows: A 50:50 (by weight) mixture was prepared from oxidized starch "Mermaid M-200" (made by Shikishima Starch Mfg. Co., Ltd.) and PVA ("Kuraray Poval PVA-117") having a degree of polymerization of 1750 and a degree of saponification of 98.5 mol %. To this mixture was added terminal-modified PVA (P-2) at a ratio of 5 to 70 parts for 100 parts of oxidized starch. The resulting mixture was heated in water at 95° C. for 2 hours for dissolution. Thus there were obtained aqueous solutions containing 10% of solids. The viscosity of the aqueous solutions was measured at 20° C. immediately after preparation and two days after preparation. The state of the solutions was observed two days after preparation.

For comparison, the same experiment as above was carried out except that P-2 was not added.

The results are shown in Table 6. It is noted that the solution without P-2 greatly changes in viscosity with time and is subject to phase separation. By contrast, the solution containing P-2 changes in viscosity only a little with time and is stable after standing.

In Comparative Experiment 11, a mixed aqueous solution was prepared by mixing 45 parts of 5% aqueous solution of corn starch dissolved at 120° C., 10 parts of 5% aqueous solution of PVA ("Kuraray Poval PVA-117") having a degree of polymerization of 1750 and a degree of saponification of 98.5 mol %, and 45 parts of 5% aqueous solution of PVA-105. The viscosity of the thus prepared aqueous solution was measured in the same manner as above. In Comparative Experiment 12, a mixed aqueous solution was prepared by mixing 45 parts of 5% aqueous solution of corn starch dissolved at 120° c, 10 parts of 5% aqueous solution of long-chain alkyl group-modified PVA (PVA-L) formed by copolymerizing with 0.6 mol % of lauryl vinyl ether, having a degree of polymerization of 700 and a degree of saponification of 98.6 mol %, and 45 parts of 5% aqueous solution of PVA-105. The viscosity of the thus prepared aqueous solution was measured in the same manner as above. In Comparative Experiment 13, a mixed aqueous solution was prepared by mixing 45 parts of 5% aqueous solution of corn starch dissolved at 120° c, 10 parts of 5% aqueous solution of modified PVA (PVA-V) formed by copolymerizing with 3 mol % of Versatic acid and 1 mol % of itaconic acid, having a degree of polymerization of 700 and a degree of saponification of 96.5 mol %, and 45 parts of 5% aqueous solution of PVA-105. The viscosity of the thus prepared aqueous solution was measured in the same manner as above. In Comparative Experiment 14, a mixed aqueous solution was prepared by mixing 45 parts of 5% aqueous solution of corn starch dissolved at 120° C., 10 parts of 5% aqueous solution of terminal-modified PVA (P-9), and 45 parts of 5% aqueous solution of PVA-105. The viscosity of the thus prepared aqueous solution was measured in the same manner as above. The results are shown in Table 7.

It is noted from Table 7 that the long-chain alkyl group at the terminal should have 4 or more carbon atoms, and the one having 3 or less carbon atoms produces almost no effect. The modified PVA formed by copolymerizing with monomer having long-chain alkyl groups slightly improves the storage stability of the aqueous solution, but it tends to cause gelation. By contrast, the aqueous solution containing a vinyl alcohol polymer having a long-chain alkyl group (having 4 or more carbon atom) at the terminal changes only a little in viscosity with time and is easy to handle with good fluidity.

TABLE 7

| Experiment No. | Kind of PVA | Viscosity (20° C., cp) | |
|---|---|---|---|
| | | Immediately after preparation | Two days after preparation |
| Experiment 11 | P-1 | 150 | 155 |
| Experiment 12 | P-7 | 102 | 108 |
| Experiment 13 | P-5 | 87 | 78 |
| Experiment 14 | P-4 | 250 | 245 |
| Experiment 15 | P-11 | 115 | 120 |
| Comparative Experiment 11 | PVA-117 | 355 | separation |
| Comparative Experiment 12 | PVA-L | gelled | gelled |
| Comparative Experiment 13 | PVA-V | 240 | gelled |
| Comparative Experiment 14 | P-9 | 145 | tendency to separation |

EXAMPLE 7

In Experiment 16, a 10% aqueous solution was prepared by heating a mixing in water at 95° C. for 2 hours for dissolution, said mixture being composed of 62 parts of PVA ("Kuraray Poval PVA-217") having a degree of polymerization of 1750 and a degree of saponification of 88.5 mol %, 35 parts of modified starch "Ko-Film 80" (made by Oji-National Co., Ltd.), and 3 parts of terminal-modified PVA (P-6). The transmittance of the solution was measured at 20° C.

In Experiment 17, an aqueous solution was prepared in the same manner as above from 62 parts of PVA-217, 35 parts of modified starch "Petrosize L-2B" (made by Nippon Starch Chemical Co., Ltd.), and 3 parts of P-6. The transmittance of the solution was measured.

In Comparative Experiment 15, a 10% aqueous solution was prepared in the same manner as above from 62 parts of PVA-217 and 35 parts of modified starch "Ko-Film 80". The transmittance of the solution was measured at 20° C. In Comparative Experiment 16, an aqueous solution was prepared in the same manner as above from 62 parts of PVA-217 and 35 parts of modified starch "Petrosize L-2B". The transmittance of the solution was measured. In Comparative Experiment 17, an aqueous solution was prepared in the same manner as above from 62 parts of PVA-217, 35 parts of modified starch "Ko-Film 80", and 3 parts of long-chain alkyl group-modified PVA (PVA-L) formed by copolymerizing with 0.6mol % of lauryl vinyl ether, having a degree of polymerization of 700 and a degree of saponification of 98.6 mol %. The transmittance of the solution was measured. The results are shown in Table 8.

It is noted that the aqueous solution containing terminal-modified PVA has a higher transmittance and better compatibility than the aqueous solution containing only PVA-217 and modified starch. It is also noted that modified PVA copolymerized with monomer having long-chain alkyl groups is not effective in improving the compatibility with modified starch.

TABLE 8

| Experiment No. | Transmittance (%) |
|---|---|
| Experiment 16 | 56 |
| Experiment 17 | 68 |
| Comparative Experiment 15 | 36 |
| Comparative Experiment 16 | 41 |
| Comparative Experiment 17 | 45 |

Transmittance was measured in the same manner as mentioned above.

EXAMPLE 8

In Experiment 18, 10% aqueous solutions were prepared by dissolving in hot water at 95° C. a 7:3 (by weight) mixture composed of PVA ("Kuraray Poval PVA-117") having a degree of polymerization of 1750 and a degree of saponification of 98.5 mol % and oxidized starch ("Mermaid M-200" made by Shikishima Starch Mfg. Co., Ltd.) and a varied amount of terminal-modified PVA (P-2).

Figure 3:
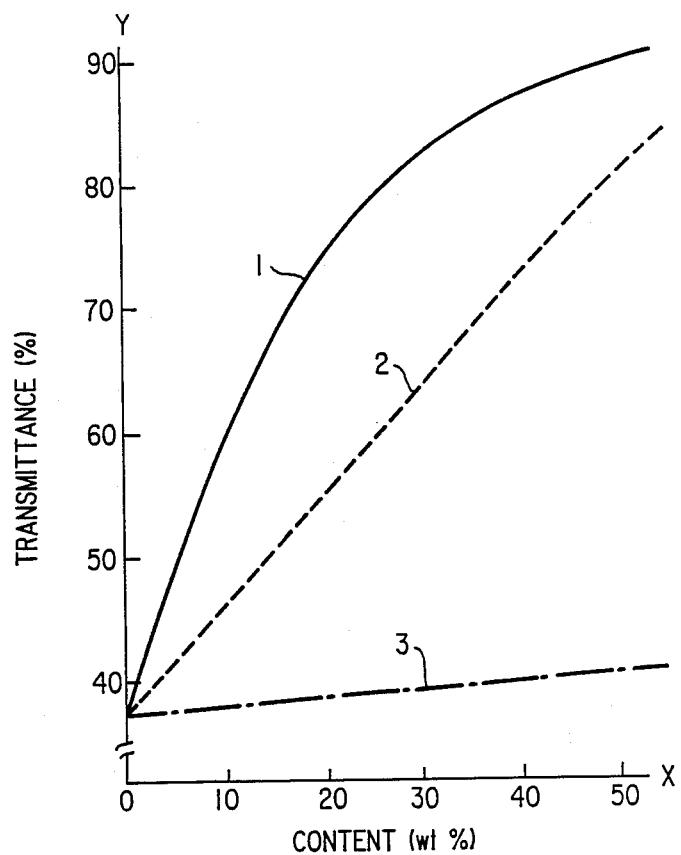
FIG. 3 is a graph in which the transmittance of an aqueous solution of the polymer composition (11) ( which is a mixture of vinyl alcohol polymer having an alkyl group of 4 to 50 carbon atoms at the terminal or modified PVA copolymerized with monomer having long-chain alkyl group, oxidized starch and PVA) is plotted against the content of vinyl alcohol polymer having an alkyl group of 4 to 50 carbon atoms at the terminal or modified PVA copolymerized with monomer having long- chain alkyl group or PVA-105. The abscissa (X) represents the content (wt %) of vinyl alcohol polymer having an alkyl group of 4 to 50 carbon atoms at the terminal or modified PVA copolymerized with monomer having long-chain alkyl group or PVA-105 in the total solids. The ordinate (Y) represents the transmittance of the aqueous solution at 20 ° c. The solid line (1) represents the results obtained with solutions containing oxidized starch and vinyl alcohol polymer having an alkyl group of 4 to 50 carbon atoms at the terminal , and the broken line (2) represents the results obtained with solutions containing oxidized starch and modified PVA' copolymerized with monomer having long-chain alkyl group, and the chain line (3) represents the results obtained with solutions containing oxidized starch and PVA-105.

The aqueous solutions containing terminal-modified PVA were better in transparency and compatibility than aqueous solutions containing only PVA-117 and oxidized starch. This is shown in FIG. 3 (solid line 1).

In Comparative Experiment 18, aqueous solutions were prepared in the same manner as above, except that the terminal-modified PVA (P-2) was replaced by PVA (PVA-105) having a degree of polymerization of 550 and a degree of saponification of 98.5 mol %. The transmittance of the solutions was measured. The results are shown in FIG. 3 (chain line 3). It is noted that the transmittance remains low regardless of the amount of PVA added. This suggests poor compatibility.

In Comparative Experiment 19, aqueous solutions were prepared in the same manner as above, except that the terminal-modified PVA (P-2) was replaced by long-chain alkyl group-modified PVA (PVA-L) formed by copolymerizing with 0.6 mol % of lauryl vinyl ether, having a degree of polymerization of 700 and a degree of saponification of 98.6 mol %. The transmittance of the aqueous solutions was measured in the same manner as in Experiment 18. The results are shown in FIG. 3 (broken line 2). It is noted that the compatibility with oxidized starch in this case is better than in the case of PVA-105 but is poorer than in the case of terminal-modified PVA.

The transmittance of the aqueous solutions was measured in the same manner as mentioned above.

EXAMPLE 9

In Experiment 19, a 10% aqueous solution was prepared by heating for dissolution a mixture in water at 95° C for 1 hour, said mixture being composed of 62 parts of PVA ("Kuraray Poval PVA-217") having a degree of polymerization of 1750 and a degree of saponification of 88.5 mol %, 35 parts of modified starch "Ko-Film 80" (made by Oji-National Co., Ltd.), and 3 parts of terminal-modified PVA (P-3). The resulting solution was cast onto a drum at 70° C. for film making.

The strength and elongation of the film were measured after conditioning at 20° C. and 65% RH for 1 week.

In Experiment 20, a 10% aqueous solution was prepared in the same manner as above from 62 parts of PVA-217, 35 parts of oxidized starch "Mermaid M-200" (made by Shikishima Starch Mfg. Co., Ltd.), and 3 parts of P-3. The resulting solution was made into film and the strength and elongation of the film were measured in the same manner as above.

In Comparative Experiment 20, film was made from a solution containing 62 parts of PVA-217 and 35 parts of "Ko-Film 80". In Comparative Experiment 21, film was made from a solution containing 62 parts of PVA-217 and 35 parts of "Mermaid M-200". In Comparative Experiment 22, film was made from a solution containing 62 parts of PVA-217, 35 parts of "Ko-Film 80", and long-chain alkyl group-modified PVA PPVA-L) formed by copolymerizing with 0.6 mol % of lauryl vinyl ether , having a degree of polymerization of 700 and a degree of saponification of 98.6 mol %. The strength and elongation of the resulting film were measured in the same manner as in Experiment 19. The results are shown in Table 9.

It is noted that the film made from a solution containing terminal-modified PVA has higher strength and elongation than the one made from a solution not containing it. Microscopic observation reveals that the particles of oxidized starch are more uniformly dispersed in Experiment than in Comparative Experiment. Film property made from the solution containing the terminal-modified PVA which has excellent compatibility with starch is superior to film property made from the solution containing the modified PVA formed by copolymerizing with monomer having long-chain alkyl groups.

The film properties were measured by using Shimadzu Autograph, Model DCS-100, made by Shimadzu Seisakusho Ltd., under the following conditions. Sample width: 15 mm, sample thickness: 60 μm, distance between two gauge marks: 50 mm, and rate of pulling: 500 mm/min.

TABLE 9

| Experiment No. | Strength (kg/mm$^2$) | Elongation (%) |
|---|---|---|
| Experiment 19 | 2.53 | 136 |
| Experiment 20 | 2.44 | 142 |
| Comparative Experiment 20 | 2.09 | 102 |
| Comparative Experiment 21 | 2.00 | 104 |
| Comparative Experiment 22 | 2.15 | 115 |

EXAMPLE 10

In each of Experiments 21 to 28, a 12% sizing solution was prepared from 55 parts of PVA ("Kuraray Poval PVA-117") having a degree of polymerization of 1750 and a degree of saponification of 98.5 mol %, 32 parts of corn starch, 7parts of oil for textile sizing ("Maconol TS-253", made by Matsumoto Yushi Seiyaku Co., Ltd.),10 parts of acrylic size "Marpozol TS-189"(20% aqueous solution, made by Matsumoto Yushi Seiyaku Co.,Ltd.), and 5 parts or 1 part of terminal-modified PVA. The resulting sizing solution was examined for stability. The one containing terminal-modified PVA was very stable at both 90° c and 30° c.

The sizing solution was cast onto a drum at 70° C. to make film about 60 μm thick. The strength and elongation of the film were measured after conditioning at 20° C. and 65% RH for 1 week. The results are shown in Table 10. It is noted that the sizing solution containing terminal-modified PVA provides film having high strength and high elongation and also having increased flexibility.

In Comparative Experiment 23, a sizing solution was prepared from 55 parts of PVA-117, 32 parts of corn starch, 7 parts of "Maconol TS-253", and 10 parts of "Marpozol TS-189" (20% aqueous solution). The resulting sizing solution was examined for stability. It was poor in stability and showed a tendency toward separation at 90° C. and 30° C.

In Comparative Experiment 24, a sizing solution was prepared from 55 parts of PVA-117, 32 parts of corn starch, 7 parts of "Maconol TS-253", 10 parts of ? Marpozol TS-189"(20% aqueous solution ), and 5 parts of vinyl alcohol polymer having a $C_3H_7$- group at the terminal. The resulting sizing agent was examined for physical properties.

It was as poor as the one not containing terminal-modified PVA

This suggests that the terminal group should have 4 or more carbon atoms.

In Comparative Experiment 25, a sizing solution was prepared from 55 parts of PVA-117, 32 parts of cornstarch, 7 parts of "Maconol TS-253", 10 parts of "Marpozol TS-189" (20% aqueous solution), and 5 parts of modified PVA (abbreviated as PVA-L) formed by copolymerizing 0.6 mol % of lauryl vinyl ether, having a degree of polymerization of 700 and a degree of saponification of 98.6 mol %.

In Comparative Experiment 26, a sizing solution was prepared from 55 parts of PVA-117, 32 parts of corn starch, 7 parts of "Maconol TS-253", 10 parts of "Marpozol TS-189" (20% aqueous solution), and 5 parts of modified PVA (abbreviated as PVA-V) formed by copolymerizing with 3 mol % of Versatic acid and 1 mol % of itaconic acid, having a degree of polymerization of 700 and a degree of saponification of 98.5 mol %. The sizing solutions in Comparative Experiments 25 and 26 were examined for stability and film properties. They are stabler than that in Comparative Experiment 23; they still have a tendency toward separation but are less stable than the one containing terminal-modified PVA. The film obtained from them has a lower elongation than that obtained from the sizing solution containing terminal-modified PVA. The results are shown in Table 10.

The stability of the sizing solution was observed after standing at 90° C. for 5 hours and also after standing at 30° C. for 24 hours. Stability is indicated by " " (very good), "o" (good), "Δ" (tendency toward slight separation), and "x" (separation).

The physical properties of the film were measured in the same manner as mentioned above.

TABLE 10

| Experiment No. | Amount of PVA added (parts) | | | | Stability | | Film properties | | |
|---|---|---|---|---|---|---|---|---|---|
| | | | | | 90° C. | 30° C. | Strength | Elongation | Young's modulus |
| 21 | P-1 | (5) | PVA-117 | (55) | — | (—) | 1.23 | 72 | 19.1 |

TABLE 10-continued

| Experiment No. | Amount of PVA added (parts) | | | | | Stability 90° C. | Stability 30° C. | Film properties Strength | Elongation | Young's modulus |
|---|---|---|---|---|---|---|---|---|---|---|
| 22 | P-8 | (5) | PVA-117 | (55) | — (−) | | | 1.32 | 88 | 18.7 |
| 23 | P-10 | (5) | PVA-117 | (55) | — (−) | | | 1.27 | 75 | 16.0 |
| 24 | P-5 | (5) | PVA-117 | (55) | — (−) | | | 1.35 | 92 | 17.2 |
| 25 | P-2 | (1) | PVA-117 | (55) | — (−) | | | 1.30 | 87 | 17.5 |
| 26 | P-4 | (5) | PVA-117 | (55) | — (−) | | | 1.31 | 95 | 16.7 |
| 27 | P-6 | (5) | PVA-117 | (55) | — (−) | | | 1.32 | 80 | 16.7 |
| 28 | P-11 | (5) | PVA-117 | (55) | — (−) | | | 1.34 | 84 | 17.6 |
| 23* | — | (−) | PVA-117 | (55) | — (−) | x | x | 0.95 | 25 | 23.1 |
| 24* | P-9 | (5) | PVA-117 | (55) | — (−) | Δ | Δ | 0.98 | 34 | 22.9 |
| 25* | — | (−) | PVA-117 | (55) | PVA-L (5) | | Δ | 1.05 | 50 | 20.0 |
| 26* | — | (−) | PVA-117 | (55) | PVA-V (5) | | Δ | 1.10 | 45 | 20.3 |

*Comparative Experiment
Unit: kg/mm² for strength, % for elongation, and kg/mm² for Young's modulus.

EXAMPLE 11

In Experiment 29, a 12% sizing solution was prepared from 55 parts of vinyl alcohol polymer(P-4)with a terminal $C_{12}H_{25}$-group, having a degree of polymerization of 1700 and a degree of saponification of 88.5 mol % 32 parts of corn starch, 7parts of oil for textile sizing('-'Macanol 222", made by Matsumoto Yushi Seiyaku Co.,Ltd.),and 10 parts of "Marpozol TS-189" (20% aqueous solution).

The resulting sizing solution was very stable after standing at both 90° C. and 30° C. The sizing solution was made into film by casting onto a drum as in Example 10. The resulting film was uniform and had a strength of 1.3 kg/mm= and an elongation of 86% after conditioning at 20° C. and 65% RH.

EXAMPLE 12

In Experiment 30, a 12% sizing solution was prepared from 80 parts of PVA ("Kuraray Poval PVA-217") having a degree of polymerization of 1750 and a degree of saponification of 88.5 mol %, 20 parts of modified starch "Ko-Film 80" (made by Oji National Co., Ltd.), 10 parts of "Maconol TS-253", and 10 parts of vinyl alcohol polymer (P-6)with a terminal $C_{12}H_{25}$- group, having a degree of polymerization of 500 and a degree of saponification of 88.5 mol %. The resulting sizing solution was very stable after standing at both 90° C. and 30° C. The sizing solution was made into film by casting onto a drum as in Example 10. The resulting film was found to have satisfactory strength and elongation.

In Experiment 31, a 12% sizing solution was prepared from 80 parts of "Kuraray Poval PVA-217", 20 parts of "Ko-Film 80", 10 parts of "Marpozol TS-189"(20% aqueous solution),5 parts of "Maconol TS-253", and parts of vinyl alcohol polymer (P-10) with a terminal $C_{18}H_{37}$-group, having a degree of polymerization of 100 and a degree of saponification of 99.0 mol %. The resulting sizing solution was very stable after standing at both 90° c and 30° c.

The sizing solution was made into film by casting onto a drum as in Example 10. The resulting film was found to have satisfactory strength and elongation.

In Comparative Experiment 27, a 12% sizing solution was prepared from 80 parts of "Kuraray Poval PVA-217", 20 parts of "Ko-Film 80", and 10 parts of "Maconol TS-253". The resulting sizing solution was not stable, suffering separation, after standing at both 90° C. and 30° C. The sizing solution was made into film by casting onto a drum as in Example 10. The resulting film was found to have poor strength and elongation as compared with that in Experiment 30.

In Comparative Experiment 28, a 12% sizing solution was prepared from 80 parts of "Kuraray Poval PVA-217", 20 parts of "Ko-Film 80", 10 parts of "Marpozol TS-189" (20% aqueous solution), and 5 parts of "Maconol TS-253". The resulting sizing solution was not stable, suffering separation, after standing at both 90° C. and 30° C. The sizing solution was made into film by casting onto a drum as in Example 10. The resulting film was found to have poor strength and elongation as compared with that in Experiment 31.

In Comparative Experiment 29, a 12% sizing solution was prepared from 80 parts of "Kuraray Poval PVA-217", 20 parts of "Ko-Film 80", 10 parts of "Marpozol TS-189" (20% aqueous solution), 5 parts of "Maconol TS-253", and 5 parts of modified PVA (PVA-L) formed by copolymerizing with 0.6 mol % of lauryl vinyl ether, having a degree of polymerization of 700 and a degree of saponification of 98.6 mol %. The resulting sizing solution was slightly stabler after standing at both 90° C. and 30° C. than that in Comparative Experiment 28, but it suffered separation. The sizing solution was made into film by casting onto a drum as in Example 10. The resulting film was found to have poor strength and elongation as compared with that in Experiment 31.

The results are shown in Table 11.

TABLE 11

| Experiment No. | Stability 90° C. | Stability 30° C. | Strength (kg/mm²) | Elongation (%) | Young's modulus (kg/mm²) |
|---|---|---|---|---|---|
| Experiment 30 | | | 2.78 | 145 | 15.8 |
| Experiment 31 | | | 3.02 | 160 | 15.6 |
| Comparative Experiment 27 | x | x | 2.07 | 85 | 16.9 |
| Comparative Experiment 28 | x | x | 1.98 | 90 | 17.0 |
| Comparative Experiment 29 | | | 2.34 | 110 | 16.5 |

EXAMPLE 13

In Experiment 32, a 10% sizing solution was prepared from 55 parts of PVA ("Kuraray Poval PVA-217") having a degree of polymerization of 1750 and a degree of saponification of 88.5 mol %, 32 parts of corn-starch, 10 parts of "Marpozol TS-189" (20% aqueous solution), 5 parts of vinyl alcohol polymer (P-3) with a terminal $C_{12}H_{25}$- group, having a degree of polymerization of 500 and a degree of saponification of 99.0 mol % and 5 to 15 parts of "Maconol TS-253". The sizing solution was made into film by casting onto a drum as in Example 10, and the physical properties of the film were measured.

In Comparative Experiment 30, a 10% sizing solution was prepared from 55 parts of "Kuraray Poval PVA-217", 32 parts of corn starch, 5 parts of PVA ("Kuraray Poval PVA-205") having a degree of polymerization of 550 and a degree of saponification of 88.5 mol %, 10 parts of "Marpozol TS-189" (20% aqueous solution), and 5 to 15 parts of "Maconol TS-253". The sizing solution was made into film by casting onto a drum as in Example 10, and the physical properties of the film were measured.

In Comparative Experiment 31, a 10% sizing solution was prepared from 55 parts of "Kuraray Poval PVA-217", 32 parts of corn starch, 5 parts of modified PVA (PVA-L) formed by copolymerizing with 0.6mol % of lauryl vinyl ether, having a degree of polymerization of 700 and a degree of saponification of 98.6 mol %, 10 parts of "Marpozol TS-189" (20% aqueous solution), and 5 to 15 parts of "Maconol TS-253". The sizing solution was made into film by casting onto a drum as in Example 10, and the physical properties of the film were measured.

The results are shown in Table 12. It is noted that in the case of sizing agents not containing PVA modified with a terminal hydrophobic group, the elongation of the film decreases as the amount of oil for textile sizing increases. By contrast, in the case of sizing agent containing terminal-modified PVA, the elongation of the film increases as the amount of oil for textile sizing increases up to about 10%. This indicates that the film has good uniformity.

TABLE 12

| | Elongation (%) of film | | | |
|---|---|---|---|---|
| | Amount of oil for textile sizing added (wt %) | | | |
| Experiment No. | 0 | 5 | 10 | 15 |
| Experiment 32 | 65 | 68 | 78 | 35 |
| Comparative Experiment 30 | 67 | 55 | 35 | 22 |
| Comparative Experiment 31 | 66 | 56 | 40 | 32 |

EXAMPLE 14

In Experiments 33 to 35, cotton yarns were sized with the sizing agents as obtained in Experiments 22, 24, and 27 in Example 10. The sized yarns were woven into a fabric. The results are shown in Table 13. In Comparative Experiments 32 and 33, cotton yarns were sized with the sizing agents as obtained in Comparative Experiments 23 and 25 in Example 10. The sized yarns were woven into a fabric. The results are shown in Table 13.

It is noted that in the case of sizing agents in Experiments 33 to 35 which contain terminal-modified PVA, the physical properties and weavability of the sized yarns are better than in the case of sizing agents in Comparative Experiments 32 and 33.

Yarn : cotton 50 s/1
Type of fabric : plain weave, broad
Density : warp 150/inch weft 120/inch
Sizing machine : Baba, 2-box type
Sizing temperature : 90° C.
Sizing speed : 45/min
Loom : Nissan air jet loom
Speed : 500 rpm
The strength and elongation of the sized yarn were measured by using Shimadzu Autograph, Model DCS-100, after conditioning at 20° C and 65% RH for 72 hours.
Distance between gauge marks : 200 mm
Rate of pulling : 200 mm/min
The abrasive strength was measured by using a TM-type cohesiveness tester under a load of 600 g and at an angle of 120°. Expressed in terms of the average number of cycles required for two of 20 yarns to break.
The weaving efficiency is expressed in terms of the ratio of the amount of fabric actually woven to the amount of fabric which is expected when the loom does not stop due to end breakage and other troubles.

TABLE 13

| | | Physical properties of sized yarn | | | | |
|---|---|---|---|---|---|---|
| Experiment No. | Sizing agent | Sizing amount (%) | Strength (g) | Elongation (%) | Abrasive strength (cycles) | Weaving efficiency (%) |
| Experiment 33 | As in Exp. 22 | 20.3 | 312 | 5.4 | 3540 | 94 |
| Experiment 34 | As in Exp. 24 | 20.7 | 320 | 5.6 | 3470 | 93 |
| Experiment 35 | As in Exp. 27 | 20.2 | 318 | 5.3 | 3450 | 94 |
| Comparative Experiment 32 | As in Compar. Experiment 23 | 20.2 | 280 | 4.3 | 2870 | 89 |
| Comparative Experiment 33 | As in Compar. Experiment 25 | 20.5 | 275 | 4.2 | 2920 | 90 |

What is claimed is:

1. A water-soluble polymer composition which comprises (A) starch and (B) vinyl alcohol polymer having an alkyl group of 4 to 50 carbon atoms at the terminal, wherein the mixing ratio of component (A) to component (B) is 100 parts by weight to 0.5–10000 parts by weight.

2. A polymer composition as claimed in claim 1, wherein (B) vinyl alcohol polymer having an alkyl group of 4 to 50 carbon atoms at the terminal is a vinyl alcohol polymer having an alkyl group of 4 to 50 carbon atoms at one terminal.

3. A polymer composition as claimed in claim 1, wherein the mixing ratio of component (A) to component (B) is 100 parts by weight to 0.5–10000 parts by weight.

4. A water-soluble polymer composition which comprises (A) starch, (B) vinyl alcohol polymer having an alkyl group of 4 to 50 carbon atoms at the terminal, and (C) polyvinyl alcohol, wherein the mixing ratio of component (A) to component is 100 parts be weight to 2-10000 parts by weight, the mixing ratio of component (B) to component (C) is 100 parts by weight to 1-10000 parts by weight, and the mixing ratio of component (A) to component (B) is 100 parts by weight to 1-3000 parts by weight.

5. A polymer composition as claimed in claim 4, wherein (B) vinyl alcohol polymer having an alkyl group of 4 to 50 carbon atoms at the terminal is a vinyl alcohol polymer having an alkyl group of 4 to 50 carbon atoms at one terminal.

6. A polymer composition as claimed in claim 4, wherein the mixing ratio of component (A) to component [(B)+(C)] is 100 parts by weight to 2-10000 parts by weight, the mixing ratio of component (B) to component (C) is 100 parts by weight to 1-10000 parts by weight, and the mixing ratio of component (A) to component (B) is 100 parts by weight to 1-3000 parts by weight.

7. A textile sizing agent which comprises (A) starch, (B) vinyl alcohol polymer having an alkyl group of 4 to 50 carbon atoms at the terminal, (C) polyvinyl alcohol, (D) oil for textile sizing and (E) water with the mixing ratio of component (A) to component [(B)+(C)] being 10-1900 parts by weight to 100 parts by weight, the mixing ratio of component (D) to components [(B)+(C)] being 0.1-200 parts by weight to 100 parts by weight, the mixing ratio of component (C) to component (B) being 0-10000 parts by weight to 100 parts by weight, the mixing ratio of component (B) to component (A) being more than 1 part by weight to 100 parts by weight, and the mixing ratio of component (B) to component (D) being more than 0.1 parts by weight to 100 parts by weight.

8. A textile sizing agent as claimed in claim 7, wherein (B) vinyl alcohol polymer having an alkyl group of 4 to 50 carbon atoms at the terminal is a vinyl alcohol polymer having an alkyl group of 4 to 50 carbon atoms at one terminal.

* * * * *

UNITED STATES PATENT AND TRADEMARK OFFICE
CERTIFICATE OF CORRECTION

PATENT NO. : 4,835,198

DATED : May 30, 1989

INVENTOR(S) : KOHNO ET AL

It is certified that error appears in the above-identified patent and that said Letters Patent is hereby corrected as shown below:

Col. 25, line 5, "component is" should read:

--component [(B)+(C)] is --;

line 5, "be" should read --by--.

Signed and Sealed this

Third Day of April, 1990

Attest:

HARRY F. MANBECK, JR.

*Attesting Officer*  *Commissioner of Patents and Trademarks*